United States Patent [19]
Zahariev

[11] Patent Number: 6,035,104
[45] Date of Patent: *Mar. 7, 2000

[54] METHOD AND APPARATUS FOR MANAGING ELECTRONIC DOCUMENTS BY ALERTING A SUBSCRIBER AT A DESTINATION OTHER THAN THE PRIMARY DESTINATION

[75] Inventor: Manuel Zahariev, Burnaby, Canada

[73] Assignee: Data Link Systems Corp., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/673,350

[22] Filed: Jun. 28, 1996

[51] Int. Cl.⁷ .................................................... G06F 13/00
[52] U.S. Cl. .............................. 395/200.33; 395/200.37; 379/100.08
[58] Field of Search ................ 395/800.01, 200.36, 395/200.37, 200.47, 200.53, 200.68, 186, 201, 200.33; 379/67, 90.01, 100.05–100.08; 455/31.1, 412

[56] References Cited

U.S. PATENT DOCUMENTS

| | | | |
|---|---|---|---|
| 5,040,141 | 8/1991 | Yazima et al. | 364/400 |
| 5,265,033 | 11/1993 | Najk et al. | 395/200.36 |
| 5,377,354 | 12/1994 | Scannell et al. | 395/673 |
| 5,483,466 | 1/1996 | Kawahara et al. | 395/200.33 |
| 5,487,100 | 1/1996 | Kane | 455/31.2 |

*Primary Examiner*—Alpesh M. Shah
*Attorney, Agent, or Firm*—Donald R. Boys

[57] ABSTRACT

An e-mail system implemented on a server having a network connection receives and forwards e-mail messages based on subscriber-supplied criteria. When a message is received addressed to the subscriber, characteristics of the message, such as existence of and size of attachments, are compared to characteristics previously supplied by the subscriber. If a match is found, the subscriber is notified, such as by a page to a pager carried by the subscriber, of the message and the nature of the match.. Facility is provided at the server for the subscriber to then call the server, log on, and provide instructions for forwarding the matched message. Forwarding may be to such as a hand-held device or a notebook computer operated by the subscriber, or to a mailbox or mailboxes on other servers, or any combination. A subscriber is then in control of points of delivery of incoming e-mail messages.

20 Claims, 3 Drawing Sheets

```
100
101     Bold = objects
102     Italic = actions (methods, code members)
103
104     Core
105
106     MailAlert ISP 203 is the provider of the MailAlert (software on server 215) service.
107     MailAlert relies on a Mail Server (software on server 215) package for Mail
        processing.
108     The Mail Server receives Mail for Customers (e.g. message sent by 210) and forwards
        it to their permanent mail address (e.g. Workstation 212 on ISP2 204), also stores a Mail
        Copy (on server 215).
109     An Alert (e.g. data content of pager message) is a basic information provided by
        MailAlert to Customers (e.g. using pager 217 via paging network 232).
110     The Mail Filter (also software on server 215) analyzes the Mail Copy (content of e-
        mail message), looking for Interest Criteria (in database on server 215). When a
        match is found, an Alert is generated.
111     Alerts are records in an Alert Table (also database on server 215) . For each Alert
        Record, a Pager Message will be generated using Sends Alerts (software on server
        215) .
112     Every Alert is stamped with a unique identifier for the Customer receiving it.
113     A Customer, using the Alert identifier can request from a MailAlert Auto Attendant
        the whole contents of the Mail Copy to be faxed to them (on Fax machine 216) or
        forwarding to a special e-mail adress (e.g. mobile device 211) . The MailAlert Auto
        Attendant will add a Fax Back Record into a Fax Back List (database on server 215).
114     For each Fax Back Record, a Fax Message will be generated and send using a Fax
        Back Server (software on server 215).
115
116
117     Procedures
118
119     Concurrent tasks in service MailAlert are
120             {
121                     Receive, Forward Mail; Store Mail Copies
122                     Filter Mail Copies
123                     Send Alerts
124                     MailAlert Auto Attendant
125                     MailAlert Fax Back Server
126                     MailAlert Mail Redirector
127             }
128
129
130     task Receive, Forward Mail; Store Mail Copies is
131             provided by third party Mail Server package for release 1.0
132
133     task Filter Mail Copies is
134             forever
135                     Wait For New MailCopy
```

*Fig 1a*

| | |
|---|---|
| 136 | MailCopy :: GetCustomer() :: FindMatchAlertCriteria( MailCopy, AlertTable ) |
| 137 | |
| 138 | task <u>Send Alerts</u> is |
| 139 |     forever |
| 140 |         if not AlertTable :: isEmpty() then |
| 141 |             AlertTable :: currentRecord :: SendAlert() |
| 142 |             AlertTable :: currentRecord :: delete |
| 143 | |
| 144 | task <u>MailAlert Auto Attendant</u> is |
| 145 |     forever |
| 146 |         Wait For Customer Call |
| 147 |         Request Parameters( Customer Id, Alert Id,Fax/Mail ) |
| 148 |         if Fax then FaxBackList :: AddFaxBackRecord( CustomerId, AlertId ) |
| 149 |         if Mail then Forward (CustomerId, AlertId, AltMailAdd ) |
| 150 | |
| 151 | |
| 152 | |
| 153 | |
| 154 | |
| 155 | task <u>MailAlert Fax Back Server</u> is |
| 156 |     forever |
| 157 |         if not FaxBackList :: isEmpty() then |
| 158 |             FaxBackList :: FirstRecord() :: GenerateFax() |

*Fig 1b*

METHOD AND APPARATUS FOR MANAGING ELECTRONIC DOCUMENTS BY ALERTING A SUBSCRIBER AT A DESTINATION OTHER THAN THE PRIMARY DESTINATION

FIELD OF THE INVENTION

The present invention is in the area of network document services, and pertains more particularly to an electronic mail (e-mail) service utilizing machine-intelligent filters to determine forwarding and notification for receipt of e-mail.

BACKGROUND OF THE INVENTION

The public network system over telephone lines known as the Internet, and particularly the portion of the Internet known as the World Wide WEB (WWW) has experienced rapid growth, and with this growth all sorts of electronic document services have been developed and provided to users. E-mail is arguably the most familiar of these services, and is provided by every Internet Service Provider (ISP) and in other ways as well. E-mail services may also be provided on other networks, such as Wide Area Networks (WANs) and the like.

Even though e-mail services have become commonplace and reliable, there are still some limitations. For example, e-mail services typically require the user to actively look up whether he or she has received e-mail, unless the user is permanently connected to the Internet. In some service packages, e-mail is delivered to a mobile device, like a palmtop-computer or a telephone. However costs in such systems are high per message and size, and if the user has no facility to review and veto delivery, he or she may receive attachments of several dozen kilobytes or even more incurring very high delivery costs. What is clearly needed is a smart filter system that operates firstly to decide, based upon certain criteria set up by the user, if, when e-mail is received, the user is to be notified by pager or similar services, and secondly if and where to forward mail. Such an enhancement in e-mail services allows the user to avoid being disturbed by unimportant messages, as well as to avoid high costs of unsolicited and or unwanted mail reception on expensive wireless systems or other remote systems.

SUMMARY OF THE INVENTION

In a preferred embodiment, a system for receiving and forwarding e-mail messages for a subscriber is provided. The system comprises a server connected to a network; and a MailAlert code set resident and operable on the server. The MailAlert code set is adapted to compare characteristics of e-mail messages received for the subscriber to specific message characteristics provided by the subscriber and pre-stored on the server, to send a message to the subscriber when a characteristic match is found, and to execute following instructions from the subscriber for forwarding of the message received for which a match was found. In one embodiment the message sent to the subscriber on finding a characteristic match is sent to a pager carried by the subscriber.

On receiving a page that a matched message has been intercepted, the server running the MailAlert code set waits for instructions from the subscriber. The subscriber may call in, log in by such as name and password, and then select specific forwarding for the intercepted and matched message. Forwarding may be to one or any combination of a number of devices capable of receiving the e-mail message. The subscriber, for example, may have the message forwarded to a hand-held or notebook computer carried and operated by the subscriber, and also to a postoffice on another server or ISP In various embodiments of the invention facility is thus provided for a subscriber to avoid having long messages sent to a remote device, such as a hand-held computer or notebook computer, and may thereby gain cost control over such message transfers. Another distinct advantage is that the subscriber, in the case of Internet services, becomes once-removed from his own Internet Service Provider (ISP), and can than change providers and e-mail systems, and still receive his e-mail seamlessly, and may have mail delivered to several places or any combination. A user may, for example, simply supply a criteria that all mail be intercepted and held for later instructions, and thereby gain control of delivery points.

BRIEF DESCRIPTION OF THE DRAWING FIGURES

Fig. 1A is a first of two portions of an example of software, in pseudo code, as it might be used in a preferred embodiment of the present invention.

FIG. 1B is a second portion of an example of software, in pseudo code, as it might be used in a preferred embodiment of the present invention.

DESCRIPTION OF THE PREFERRED EMBODIMENTS

Figure 2:
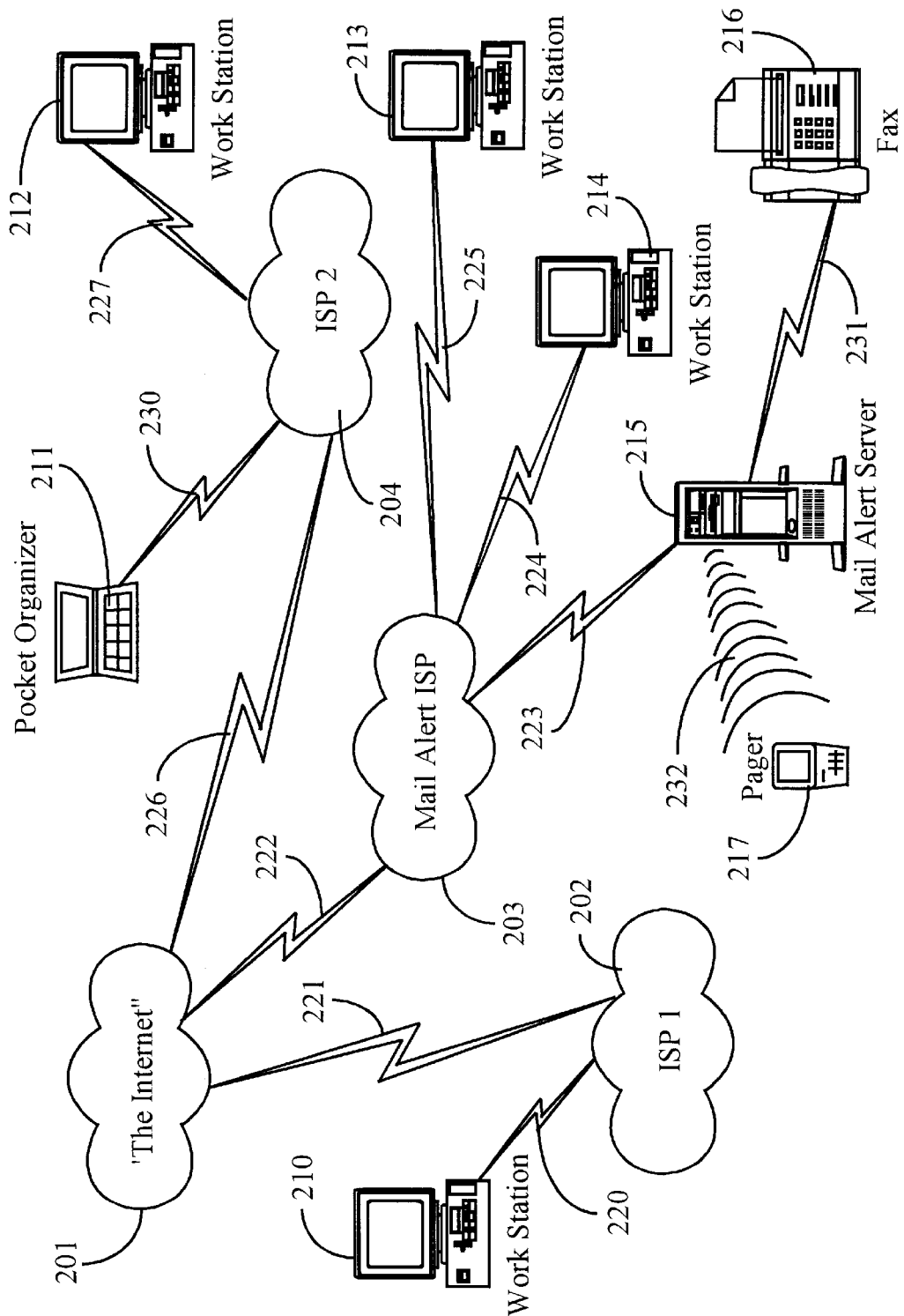
FIG. 2 shows a system topology including interconnection of all units in a preferred embodiment of the present invention.

In a preferred embodiment a server is used, connected to a network such as the Internet as well as to the phone system to perform the required functions of the invention As can be seen from the Figures and as described below, most of the implementation of embodiments of the present invention is in interconnection of apparatus, and in integration of the apparatus by unique software resident and executed on a server. It will be apparent to those with skill in the art that there are many ways to partition such a system, and both the topology and the software partition can be changed substantially without really changing the resulting function of the complete system. Therefore the following descriptions have to be viewed as only one embodiment among many possible embodiments.

In FIGS. 1A and 1B, a rich pseudo code is used to illustrate how the core software is built, with addition of most-used modules. Lines 106 through 114 define the program objects. Lines 119 through 158 show a list of concurrent and invoked tasks. In line 106 MailAlert is defined as the principle code routine in the embodiment described. Mail Server described in line 108 could be a basic version of UNIX™ SendMail, a widely used standard mail software.

SendMail does receive mail from the Internet, typically using Simple Mail Transfer Protocol(SMTP).

In the embodiment described herein of the present invention, when e-mail is received, a copy is typically forwarded to the customer's normal base address. A copy is also retained on the server, which is then analyzed by the MailFilter code routine on line 110. A match of pre-programmed criteria with mail message characteristics generates an Alert, which on Line 111 is used to generate a page to a paging unit carried by the subscriber. Additionally, each page is complemented with a unique ID stamp for identification. In line 113 and 114 the subscriber can request either a fax back or a forwarding of the specific message by phone using the id stamp from line 112. That could happen in several ways. In one instance, the user would call an operator, identify himself, tell the operator the ID stamp of the requested message, and tell also the means, fax, e-mail or similar, and location of the forwarding, by e-mail address, fax number or similar. In the other instance, he would call into a voice-response system, identify himself by either touching or speaking his customer id, then entering the message ID stamp, and then selecting one of several pre-selected destinations, or enter a method and an address again by means of touching or speaking.

Procedure MailAlert on lines 119 through 127 basically repeats all basic steps indefinitely. In line 121 are the tasks of Receive, Forward and Store Mail, which can be handled by standard packages such as SendMail of UNIX™. Other similar products can be substituted, or modified or adapted to perform in the desired manner.

In line 133, a Filter Mail procedure filters new incoming mail, then looks up the customer for whom it was received in the customer database, gets stored customer records including pre-stored e-mail filtering criteria, and checks for a match, storing relevant results in the alert table.

In line 138 the task SendAlerts is continuously taking record by record from the AlertTable and emptying into paging systems, according to instructions stored in that record by FilterMail from the customer record.

The task MailAlert Auto Attendant on lines 144–149 takes customer calls, and based on customer ID and Alert ID then does either a fax or mail forward of the relevant messages. Optionally, attachments can be included to be expanded or dropped.

The task MailAlert Fax Back Server is then used to actually work off the queue of faxes to be sent to customers.

FIG. 2 shows how a typical topology might look in a preferred embodiment of the present invention. A mail sender can be sending e-mail from workstation or PC 210, via Internet connection 220 to Internet Service Provider (ISP) 202. Although in this example the connection is through the well-known Internet, practice of the present invention is not limited to use with the Internet. The MailAlert system of the invention may be practiced wherever e-mail is used, regardless aof the nature of the Network. The Internet is exemplary. The mail is then forwarded via link 221 to "backbone" 201, and on to MailAlert ISP 203 via connection 222 to the backbone. Inside MailAlert ISP the mail is received by Server 215 via connection 223 from the subnet 203. The MailAlert software then forwards a copy to the subscriber (If we call the same person both subscriber and customer, confusion is sure to result. At the same time, if a match between criteria and message characteristics is found, the system alerts via telephone and paging network 232 the subscriber's pager 217. The subscriber then can call in and have the message forwarded to fax 216 via telephone network connection 231, or he can have it forwarded to an alternate mail address, which in this example is represented by pocket organizer 211, which has a wireless link to ISP 204. That then connects in normal manner from server 215.

If the subscriber has Internet service from the same ISP as MailAlert, he could connect like workstation 213 via connection 225.

The here-presented system provides an ability to selectively filter information based on e-mail, and to notify a subscriber of availability of such selected information, giving the subscriber an option to have the message forwarded either by e-mail or fax to a specific location. For example, if a subscriber expects a document as an attachment by e-mail, but is only interested in comments contained in the copy (body) of the message, he may setup a filter as following: Filter1:Sender=XYZ:Subject= ABC:Attachment=Yes;. This Filter would tell the filter software to look for matches in this subscriber's incoming mail. Once a message is received that matches the criteria, the subscriber will receive a page that could look like:MsgID= 1234, Filter1. The subscriber then can call the Auto Attendant and identify himself with Customer ID and password, upon which he will be prompted to enter the message ID. Next he can select means of delivery, like e-mail or fax, and then enter numbers or addresses, or select one of a limited set of preprogrammed numbers or addresses.

After the subscriber makes all of the needed selections and entries, the system will immediately start to process his request, and within seconds delivery should begin. Alternatively, instead of using a pager, many models of new digital phones have paging facilities, so the message could include the call back number, which can be dialed in single button access. In another embodiment two-way pagers may be used to allow selecting immediate forwarding based on preprogrammed numbers or addresses.

In yet another embodiment, mail messages or parts of mail messages meeting certain criteria can be included with the notification message.

It will be apparent to those with skill in the art that there are many alterations that may be made in the embodiments described herein without departing from the spirit and scope of the invention. For example, programming of the filter criteria can be achieved in any one of several ways, all of which should be familiar to those with skill in the art.

Programming of all of the several functional modules of the Mail Alert System according to embodiments of the invention can be done in many different ways, according to individual preferences of programmers, while falling within the scope of the invention. Moreover, there are alternatives that may be taken in hardware connection, also while falling within the spirit and scope of the invention. The invention, therefore, is defined by the scope of the following claims.

What is claimed is:

1. An e-mail system comprising:

a server connected to a network; and a Mail Alert code set resident and operable on the server;

wherein the Mail Alert code set is adapted to alert a subscriber by a message to the subscriber's pager, the message not including content of the e-mail, that e-mail has been received, and to await forwarding instructions from the subscriber before forwarding the e-mail, then to forward the e-mail to a destination instructed by the subscriber; and wherein the Mail Alert code set is adapted to filter incoming e-mail documents, including parsing the message portion of the e-mail for content, according to prestored document characteristics and to alert the subscriber at the second destination only on finding a characteristic match.

2. A system as in claim 1 further comprising an interface whereby a subscriber, responding to an alert, may instruct the server to forward a copy of a received document to a destination other than the first destination.

3. A system as in claim 2 wherein the interface is a telephone interface.

4. A system as in claim 3 wherein the interface comprises a human operator at the server interacting with the subscriber.

5. A system as in claim 3 further comprising a telephone menu system wherein a subscriber, responding to an alert, may log in, identify messages, select from recorded options, and input information for forwarding of identified documents.

6. An e-mail server comprising:

a document handling system adapted for receiving and forwarding e-mail to a specific destination; and a Mail Alert system adapted to alert a subscriber by a message to the subscriber's pager, the message not including content of the e-mail, that e-mail for the subscriber has been received, and is waiting for delivery upon receiving forwarding instructions from the subscriber; and wherein the Mail Alert code set is adapted to filter incoming documents, including parsing the message portion of the e-mail for content, according to prestored document characteristics, and to alert the subscriber on finding a characteristic match.

7. An e-mail server as in claim 6 further comprising an interface whereby a subscriber, responding to an alert, may instruct a server to forward a copy of a received document to a destination other than the subscriber's pager.

8. An e-mail server as in claim 7 wherein the interface is a telephone interface.

9. An e-mail server as in claim 8 wherein the interface comprises a human operator at the server interacting with the subscriber.

10. An e-mail server as in claim 8 further comprising a telephone menu system wherein a subscriber, responding to an alert, may log in, identify messages, select from recorded options, and input information for forwarding of identified e-mail.

11. A method for receiving and routing e-mail at a server, comprising steps of:

(a) receiving at the server e-mail addressed to a subscriber;

(b) alerting the subscriber by a message to the subscriber's pager, the message not including content of the e-mail, of the receipt of e-mail at the server; and forwarding the e-mail after receiving routing instructions from the subscriber; and wherein the method further comprising a step to filter incoming e-mail, including parsing the message portion of the e-mail for content, according to prestored document characteristics, and to alert the subscriber at the second destination on finding a characteristic match.

12. The method of claim 11 further comprising a step for forwarding a copy of a received e-mail to a destination other than the subscriber's pager in response to instruction from a subscriber responding to an alert.

13. The method of claim 12 wherein the instruction is received at the server from the subscriber via a telephone interface.

14. The method of claim 13 wherein the instruction is received at the server from the subscriber via a human operator.

15. The method of claim 13 further comprising a telephone menu system wherein a subscriber, responding to an alert, may log in, identify messages, select from recorded options, and input information for forwarding of identified e-mail.

16. A machine-intelligent agent for processing an e-mail addressed to a subscriber, comprising:

a reception agent for receiving and storing a copy of the e-mail;

a paging agent for alerting the subscriber at a pager of the receipt of the e-mail, the alert not including content of the e-mail; and a forwarding agent for sending a copy of the e-mail to the subscriber at a destination sent to the agent after the alert; and wherein the machine-intelligent agent further comprising a filtering agent adapted to filter incoming e-mail, including parsing the message portion of the e-mail for content, according to prestored document characteristics, and to alert the subscriber on finding a characteristic match.

17. A machine-intelligent agent as in claim 16 further comprising an interface wherein a subscriber, responding to an alert, may instruct the machine intelligent agent to forward a copy of a received e-mail message to a destination other than the subscriber's pager.

18. A machine-intelligent agent as in claim 17 wherein the interface is a telephone interface.

19. A machine-intelligent agent as in claim 17 wherein the interface comprises a human operator interacting with the subscriber.

20. A machine-intelligent agent as in claim 18 further comprising a telephone menu system wherein a subscriber, responding to an alert, may log in, identify messages, select from recorded options, and input information for forwarding of identified e-mail.

* * * * *